United States Patent [19]

Mori et al.

[11] 3,867,520

[45] Feb. 18, 1975

[54] MEDICATED POLYAMINO ACID FILM FOR OCCLUSIVE DRESSING THERAPY

[75] Inventors: Shigeo Mori, Chagasaki; Akira Akamatsu; Kazushi Togo, both of Kawasaki, all of Japan

[73] Assignee: Ajinomoto Co., Inc., Tokyo, Japan

[22] Filed: Feb. 5, 1974

[21] Appl. No.: 439,956

Related U.S. Application Data

[63] Continuation-in-part of Ser. No. 242,754, April 10, 1972, abandoned.

[30] Foreign Application Priority Data

Apr. 14, 1971  Japan.............................. 46-23592

[52] U.S. Cl.................. 424/36, 260/78 A, 424/32, 424/78, 424/177, 424/319, 128/156, 128/260
[51] Int. Cl......................... A61k 1/00, A01n 11/00
[58] Field of Search......... 424/32, 36, 78, 319, 177; 260/78 A; 128/156, 260

[56] References Cited
UNITED STATES PATENTS

| | | | |
|---|---|---|---|
| 2,657,972 | 11/1953 | Woodward | 260/78 A X |
| 2,666,012 | 1/1954 | Ferguson | 424/319 X |
| 2,666,013 | 1/1954 | Ferguson | 124/319 X |
| 2,691,643 | 10/1954 | Chirtgl et al. | 260/78 A |
| 2,705,705 | 4/1955 | Chirtol et al. | 260/78 X |
| 2,937,974 | 5/1960 | Ferguson | 424/319 X |
| 3,052,655 | 9/1962 | Fox et al. | 260/78 A |
| 3,061,512 | 10/1962 | Anderson et al. | 424/319 X |
| 3,076,790 | 2/1963 | Fox et al. | 260/78 A |
| 3,331,814 | 7/1967 | Randall | 260/78 A |
| 3,371,069 | 2/1968 | Miyamae et al. | 260/78 A |

OTHER PUBLICATIONS

Walder et al. Trans. Amer. Soc. Artif. Int. Organs 15: 29–32. (1969) "Evaluation of Synthetic Films as Wound Covers".
Spira et al. J. Biomed. Matgr. Rgs. 3: 213–234 (1969) "Evaluation of Synthetic Fabrics as Artificial Skin Grafts to Experimental Burn Wounds".

*Primary Examiner*—Shep K. Rose
*Attorney, Agent, or Firm*—Hans Berman; Kurt Kelman

[57] ABSTRACT

Therapeutic agents are dissolved or otherwise dispersed in carriers which form a separate, disperse phase in films having a continuous matrix of polyamino acid. The carriers tend to migrate to the film surface when the film temperature is raised to body temperature, thereby gradually bringing the therapeutic agents to the film surface for contact with the skin or other body surface to which the film is applied as an occlusive dressing. The rate at which a therapeutic agent is released from the film can be controlled by varying the amount of carrier.

8 Claims, No Drawings

MEDICATED POLYAMINO ACID FILM FOR OCCLUSIVE DRESSING THERAPY

This application is a continuation-in-part of Ser. No. 242,754, filed on Apr. 10, 1972, and now abandoned.

This invention relates to medicated films for therapeutic use, and particularly to medicated polyamino acid films.

Polyamino acid films have been used successfully in occlusive dressing therapy of skin diseases and in similar therapeutic applications because they are permeable to gases and water vapor, but impermeable to bacteria. They may be applied over ointments containing therapeutic agents. It has been attempted to avoid the use of ointments by incorporating the therapeutic or pharmaceutically active agents in the film itself, but the agents migrate to the film surface too slowly for the desired therapeutic effect.

It has now been found that an active ingredient such as a pharmaceutically active agent is released from a polyamino acid film at a higher rate when incorporated in an inert carrier forming a dispersed phase and tending to migrate outward of the film faster than the relatively minor amount of the active ingredient. The rate at which the active ingredient is released with the carrier at the film surface increases with the temperature. At any given temperature, and for any given carrier, it increases with the amount of dispersed carrier phase.

Carriers suitable for the purpose of this invention, therefore, should be insoluble or poorly soluble in the polyamino acid film. If soluble, they must be present in an amount sufficient to form a separate phase, and therefore tend to migrate to the film surface, taking the active agent with them. The amount of carrier to be employed varies with the nature of the carrier and of the film former and with the rate at which it is desired to transfer the active agent from the interior of the film to the exposed surface.

For the applications to the human body with which this invention is particularly concerned, the carrier must be non-toxic toxic when in contact with the skin or other body tissue to which the film is applied. It also should be a liquid or a soft solid having the consistency of a paste or ointment at normal body temperature of 37°C, although a solid as hard as carnauba wax may constitute a portion of the carrier.

The polyamino acid films that are capable of improvement according to this invention are known in themselves. They may be homopolymers of amino acids which are neutral $\alpha$-amino acids, such as glycine, alanine, phenylalanine, leucine, isoleucine, valine, norvaline, norleucine, methionine, or $\omega$-monoesters of acidic amino acids with lower alkanols such as $\gamma$-methyl glutamate, $\gamma$-ethyl glutamate, $\gamma$-butyl glutamate, $\beta$-ethyl aspartate, $\beta$-butyl aspartate, or N-acyl derivatives of basic amino acids, such as $\epsilon$-N-acetyllysine, $\epsilon$-N-butyroyllysine, $\delta$-N-acetylornithine, $\delta$-N-butyroylornithine, copolymers of two or more of the above amino acids, and mixtures of such homopolymers and copolymers.

Homopolymers and copolymers which have predominant repeating units of $\gamma$-lower-alkyl glutamate are preferred because of their favorable mechanical properties, and because the carriers suitable for this invention are practically insoluble in a polyamino acid matrix consisting of poly-lower-alkyl glutamate or containing enough glutamate units to have the characteristic properties of the polyglutamates. The term "lower alkyl" is being used throughout this application to indicate alkyl having up to four carbon atoms.

If the polyamino acid is prepared from an $\omega$-monoester of an acidic amino acid or from an N-derivative of a basic amino acid, the alcohol moiety of the ester or the N-substituent in the basic amino acid derivative may be removed partly or entirely after polymerization.

The polyamino acids are conveniently prepared by polymerizing the corresponding N-carboxy anhydrides prepared from the amino acids by means of phosgene, but other known methods may be resorted to. The degree of polymerization is chosen to achieve the desired film forming properties of the polymer. A polyamino acid having a degree of polymerization (D.P.) of 100 is generally a suitable film former, although both lower, and particularly higher values of D.P. may be preferable under suitable conditions, not themselves relevant to this invention. The film does not interact chemically with the active agent, the carrier, or the covered body surface, and its optical activity or lack of such activity is not relevant.

Materials which have been found suitable as carriers or components of carriers for active agents in the modified polyamino acid films of the invention include oils, fats, and waxes generally, and particularly semi-drying and non-drying vegetable oils, such as cotton seed oil, rape seed oil, soy bean oil, camellia oil, olive oil, castor oil, coconut oil, and palm oil; animal fats such as beef tallow and lard; mineral oil, such as paraffin oil; vegetal waxes including carnauba wax, cotton seed stearin, and Japan wax; animal waxes such as beeswax and wool fat (hydrous lanolin); mineral waxes such as paraffin and petrolatum.

Synthetic oil-like and wax-like substances which meet the requirements spelled out above are equally useful. They include the polyoxyalkylene glycols, such as polyethylene glycol and polypropylene glycol, citric acid esters including triethyl citrate, tributyl citrate, and acetyl tributyl citrate, maleic acid esters including the diethyl and dibutyl maleates, also dibutyl adipate, dibutyl sebacate, dioctyl azelate and other esters of polyhydric acids with monobasic alcohols.

Esters commonly employed as plasticizers in synthetic resin compositions are good and inexpensive carriers for the purposes of this invention if they meet the requirements outlined above. They include glycol esters such as diethylene glycol dibutyrate, triethylene glycol dilaurate, polyethylene glycol dibutyrate, and polypropylene glycol dibutyrate. Other compounds heretofore employed as plasticizers in synthetic resins and suitable for this invention include epoxidized soybean oil, epoxybutyl stearate, and epoxyoctyl stearate.

The carriers of the invention are generally characterized by the fact that they do not ionize in contact with water. As will be evident from the above list, which is necessarily incomplete, the chemical nature of the carrier is otherwise unimportant as long as the carrier is chemically inert to the polyamino acid film and to the active agent. Furthermore, it must be incompatible with the polyamino acid or used in excess of the amount in which it would be compatible, that is, homogeneously mix with the film former, so that the carrier forms a phase separate from and dispersed in the continuous polyamino acid phase. It is desirable that the mechanical strength of the polyamino acid film be unaffected by the carrier. The maximum amount of carrier that may be employed is thus limited according to the required mechanical strength of the film. It should normally be smaller than that of the polyamino acid forming the matrix of the film.

The film of this invention essentially consists of a matrix of polyamino acid in which the carrier is dispersed, the active agent being dissolved or otherwise dispersed in the carrier. The films are conveniently prepared by mixing the carrier and the active agent with a solution of the polyamino acid, and removing the solvent. The polyamino acid solution may be obtained by polymerizing the corresponding N-carboxy anhydride in a suitable inert solvent in the presence of a tertiary amine as an initiator, or by dissolving the solid polymer.

The active agent must be inert to the carrier and the film former at the temperatures at which the modified film is to be stored and used, that is, at all temperatures not exceeding 37°C, but may be chosen freely otherwise to suit the intended use. When the film of the invention is to be used for occlusive dressing therapy of skin diseases, the active agent may be a germicide, antifungal agent, a cortico steroid or other hormone, and generally any biological or chemotherapeutic pharmaceutical agent suitable for topical application, that is, capable of having a medicinal effect on the body when in contact with the skin or other exposed tissue to which the film may be applied.

The mixture of polyamino acid, carrier, and active agent may be shaped into a film by any conventional method. A layer of the polyamino acid solution containing the carrier and the active agent may be deposited on a suitable smooth substrate, such as release paper, or a glass or metal plate, and the solvent removed by air-drying at ambient or elevated temperature. The film is stripped from the substrate and refrigerated unless used at once. The following Examples further illustrate the invention.

EXAMPLE 1

13 g γ-Methyl L-glutamate N-carboxy anhydride was suspended in a mixture of 50 ml methylene chloride and 50 ml dioxane, and 0.053 g triethylamine was added to initiate conversion of the anhydride to poly-γ-methyl L-glutamate. The solution so obtained contained 100 g/l polymer.

0.5 g Sulfadiazine, 5 ml acetone, and 0.5 g hydrous lanolin were mixed and added to the polymer solution with stirring. After removal of air from the mixture so obtained, the latter was spread on release paper by means of an applicator having a slit 0.3 mm side. The deposited layer was air-dried at 80°C, and the dried film was stripped from the release paper.

It was cut into 10 cm squares which were each placed tightly between two sheets of filter paper. The laminar specimens so obtained were stored in an incubator at 37°C for 24 hours. The pieces of filter paper were extracted, and the amount of nitrogen in the extract was determined by Kjeldahl's method as a measure of the active agent which had migrated to the surface.

The procedure was repeated under otherwise identical conditions with films prepared without lanolin, with 1 g, with 3 g, and with 5 g lanolin. The amounts of sulfadiazine that had migrated to the film surface within 24 hours at 37° with the lanolin carrier and had been absorbed in C filter paper were calculated from the Kjeldahl analyses and are listed below in Table 1 in grams and in percent of the total active agent initially present in the film for the several amounts of carrier employed.

TABLE I

| Carrier, g | Active agent | |
|---|---|---|
| | g | % |
| 0 | 0 | 0 |
| 0.5 | 0.04 | 8 |
| 1 | 0.14 | 28 |
| 3 | 0.15 | 30 |
| 5 | 0.23 | 46 |

EXAMPLE 2

10 g Flakes of poly-γ-ethyl L-glutamate were homogeneously dissolved in 100 ml ethyl acetate. A mixture of 0.5 g chloramphenicol, 5 ml ethyl acetate, and 0.5 g petrolatum was stirred into the solution, and the mixture so obtained was deaerated and spread in release paper in a uniform layer as in Example 1 and air-dried at 80°C. Other films were prepared from otherwise identical mixtures containing 0, 1, 3, 5, and 10 g petrolatum. The film was tested for migration of the active agent as in Example 1, and the amounts of amphenicol calculated from analysis of the filter paper sheets are listed in Table II.

TABLE II

| Carrier, g | Active agent | |
|---|---|---|
| | g | % |
| 0 | 0 | 0 |
| 0.5 | 0.01 | 2 |
| 1 | 0.08 | 16 |
| 3 | 0.12 | 24 |
| 5 | 0.18 | 36 |
| 10 | 0.30 | 60 |

EXAMPLE 3

10 g Copolymer of γ-ethyl L-glutamate and L-valine (2:1) in the form of flakes was dissolved in a mixture of 50 ml benzene and 50 ml ethyl acetate. 0.5 g Pyrimidine penicillin, 5 ml chloroform, and 0.5 g olive oil were stirred into the homogeneous polymer solution, and a film was prepared as in the preceding Examples, further films being made from mixtures respectively containing 0, 1, 3, 5, and 8 g olive oil as a carrier, but not otherwise different. The amounts of pyrimidine penicillin found in the filter paper sheets after 24 hours at 37°C are listed in Table III.

TABLE III

| Carrier, g | Active agent | |
|---|---|---|
| | g | % |
| 0 | 0 | 0 |
| 0.5 | 0.02 | 4 |
| 1 | 0.03 | 6 |
| 3 | 0.11 | 22 |
| 5 | 0.13 | 26 |
| 8 | 0.21 | 42 |

No significant amounts of sulfadiazine, chloroamphenicol, or pyrimidine penicillin could be detected on the surfaces of the films prepared without carrier, thus indicating that the carrier is effective to bring the active agent to the surface, not only to transfer it from the film surface to the paper layers in the laminar specimen.

The percentage of active agent present in the polyamino acid film that can be brought to the film surface within 24 hours at 37°C by the carriers employed in the Examples thus can be controlled from 2 percent to 60 percent by merely varying the total amount of carrier, and thus the amount of the carrier present as a phase separate from the polyamino acid.

Analogous results are obtained with the other carriers enumerated above when the same are used in amounts sufficient to form a separate phase in a matrix of polyamino acid so that they migrate to the film surface at body temperature due to their incompatibility with the polymer. The mobility of the carriers in the polyamino acid films decreases sharply with decreasing temperature, so that the modified films of the invention retain their effectiveness for adequate periods when stored in a refrigerator at 8° to 10°C, and for periods of one month or more at sub-freezing temperatures.

The medicated films are applied directly to the skin or other body tissue to be treated, and may be left in contact with the tissue for up to 8 days. They are preferably covered with gauze to absorb any carrier that migrates to the surface of the film remote from the body.

The nature of the active agent in the dispersed carrier particles is not directly relevant to this invention, and substances other than those specifically referred to in the Examples may be resorted to to produce a medicinal effect on the body when in contact with the skin or other exposed body tissue.

A tape commercially available for medicinal use as an occlusive dressing has a backing of polyethylene which carries a layer of acrylic adhesive mixed with flurandrenolide, a corticosteroid. The films of the invention are sufficiently similar to this known product as not to require a more detailed description of their mode of application.

What is claimed is:

1. A body-contacting solid film for an occlusive dressing essentially consisting of
   a. at least one poly-α-amino acid as a solid, film-forming matrix,
      1. said acid being a homopolymer of an α-amino acid of the group consisting of glycine, alanine, phenylalanine, leucine, isoleucine, valine, norvaline, norleucine, methionine, the ω-lower-alkyl esters of glutamic acid and aspartic acid having 1 to 4 carbon atoms in the lower alkyl group thereof, the ω-N-mono-alkanoyl derivatives of lysine and ornithine having 2 to 4 carbon atoms in the alkanoyl group, or a copolymer of at least two members of said group;
   b. a carrier dispersed in said matrix as a separate phase,
      1. said carrier being liquid or semi-solid at 37°C,
      2. said carrier being insoluble or poorly soluble in said matrix at 37°C, and non-toxic to the human body when in contact with human skin,
      3. the amount of said dispersed carrier being sufficient to cause a significant portion, greater than incidental traces, of said carrier to migrate to a surface of said film at 37°C; and
   c. a pharmaceutically active agent dispersed in said carrier in an amount sufficient to cause migration of said agent with said carrier to said surface at 37°C in a therapeutically significant amount,
      1. the weight of said carrier in said separate phase being at least equal to the weight of said agent dispersed in said carrier, but smaller than the weight of said matrix,
      2. said carrier and said agent being substantially completely retained in said matrix for one month at temperatures below 0°C.

2. A film as set forth in claim 1, wherein said matrix, said carrier, and said agent are chemically inert to each other at all temperatures up to 37°C.

3. A film as set forth in claim 2, wherein said carrier essentially consists of at least one member of the group consisting of fats, oils, and waxes.

4. A film as set forth in claim 2, wherein said carrier is unable to form ions in contact with water.

5. A film as set forth in claim 2, the amount of said carrier being sufficient to cause transfer of at least 2 percent of the weight of said agent from the interior of said film to the film surface within 24 hours at 37°C.

6. A film as set forth in claim 2, wherein said at least one polyamino acid has a degree of polymerization of at least 100.

7. A film as set forth in claim 1, wherein said poly-α-amino acid has predominant repeating units of γ-lower-alkyl glutamate.

8. A film as set forth in claim 7, wherein said poly-α-amino acid is a copolymer of γ-ethyl glutamate and valine in a mole ratio of 2:1.

* * * * *